United States Patent [19]

Marsek

[11] Patent Number: 5,028,350

[45] Date of Patent: Jul. 2, 1991

[54] LIQUID SPRAY MASK

[76] Inventor: Patrick W. Marsek, 408 Tanglewood Ct., Vernon Hills, Ill. 60061

[21] Appl. No.: 438,732

[22] Filed: Nov. 17, 1989

[51] Int. Cl.[5] .................... C09K 3/22

[52] U.S. Cl. .................... 252/88; 106/2; 106/311

[58] Field of Search .................... 252/88, 174.17, 554, 252/555; 427/207.1; 106/2, 311

[56] References Cited

U.S. PATENT DOCUMENTS

| | | | |
|---|---|---|---|
| 312,694 | 8/1884 | Babington | 106/2 |
| 1,795,455 | 3/1931 | Vaughan | 106/139 |
| 1,861,165 | 5/1932 | Ryan | 106/2 |
| 2,120,569 | 11/1935 | Oliver | 106/2 |
| 2,306,887 | 3/1938 | Klose | 106/2 |
| 2,362,964 | 8/1940 | Affleck | 106/2 |
| 4,801,635 | 1/1989 | Zinkan | 252/88 |

OTHER PUBLICATIONS

*Hawley's Condensed Chemical Dictionary,* Van Nostrand Reinhold Company, New York, 1987, p. 1241.

*Primary Examiner*—Paul Lieberman
*Assistant Examiner*—Alexander G. Ghyka
*Attorney, Agent, or Firm*—Kinzer, Plyer, Dorn, McEachran & Jambor

[57] ABSTRACT

A masking solution to settle dust and safeguard against overspraying in the area of a vehicle not to be painted, predominately an aqueous solution containing a carrier (e.g. glycerol), a surfactant and Xanthan gum.

3 Claims, 1 Drawing Sheet

LIQUID SPRAY MASK

FIELD OF THE INVENTION

Figure 1:
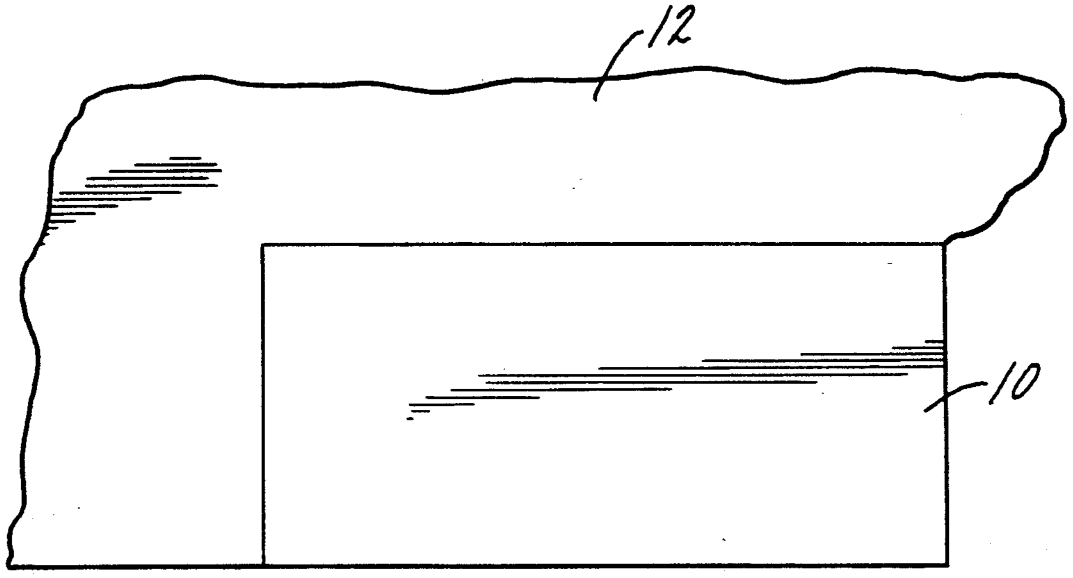

This invention relates to masking the body of a vehicle to settle dust and protect against overspraying the undamaged area during body shop painting. The invention, in practice, will be applied in most instances to an automobile, but the invention can be applied as well to boat hulls, fuselages, and so on.

BACKGROUND OF THE INVENTION

The ordinary masking procedure for a vehicle to be painted is to "paper mask" and/or plastic wrap the areas not to be painted. Clearly, time allows only a limited area adjacent the damaged area to be covered or wrapped. However, the vehicle has usually accumulated a considerable dust film (if not being dirty outright) by the time the paint job (spray paint) is to be undertaken. This accumulation of dirt on the vehicle is invariably disturbed during the paint job and can settle on the wet paint causing a slight pebbly appearance which can be thoroughly objectionable to the fastidious customer. This problem arises even in the instance of a freshly washed car.

The primary object of the present invention is to overcome the problem by spraying (e.g. airless spray) the entire vehicle body with a non-volatile, non-toxic, water-soluble, non-bleeding solution including glycerin and a non-drying gum which not only protects against overspraying, but effectively traps any dust on the vehicle, especially that which may deposit as fallout from within the shop while the job is being done. A related object of the invention is to include a detergent in the masking solution so that when the paint job is finished the masking solution will convert to a suds during a wash; if by accident some solution is sprayed on the damaged part to be painted, it can be easily removed with a damp cloth.

The solution is effective when applied to almost any surface-cured paint, glass, vinyl, rubber, plastic or chrome and will protect against virtually any lacquer, enamel or urethane overspray.

In an actual test performance at a quality body shop ($\frac{1}{2}$ protection, $\frac{1}{2}$ repair), the total time of preparation by the conventional method required six and one-third hours ($56.70) reduced to one and one-half hours ($13.50) under the present invention. The conventional method included (1) the standard car wash, (2) "prep" time, and (3) clean up. Step (1) is eliminated under the present invention, step (2) required one-half hour instead of two hours, and the clean-up job was reduced from four hours to one hour. Not only is labor time saved under items (1) and (2), the paint job under the present invention requires less watersanding and buffing (clean-up) because there is little or no dirt to be removed from the finished coat. In fact, the savings in time is so considerable that the body shop can represent to the customer that wheel wells, door jambs and engine components will be masked at no extra charge. Moreover, the interior of the spray booth can be masked.

In a second test ($\frac{3}{4}$ protection, $\frac{1}{4}$ repair), the time factors were 4.75 hours (conventional) compared to 1.5 hours. The related time and materials costs were $68.50 vs. $25.50.

THE DRAWING

Figure 2:
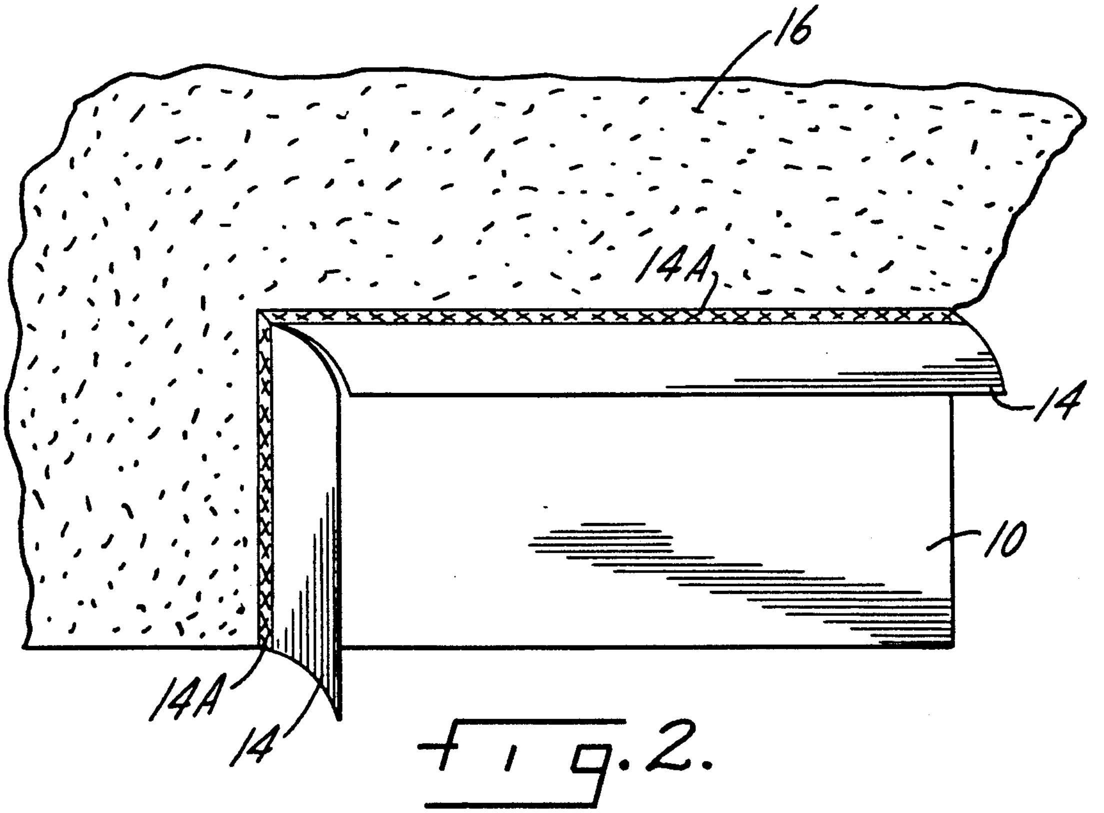

FIGS. 1 and 2 are schematic views illustrating the preparation procedures under the present invention.

PREFERRED EMBODIMENT

| Ingredient | Vol. % | Wt. % |
|---|---|---|
| Water | 80.1 | 75.99 |
| Glycerol | 18.0 | 21.88 |
| Surfactant | 0.7 | 0.671 |
| Xanthan Gum | 0.7 | 0.821 |
| Sequestrate | 0.5 | 0.639 |
| Total | 100.0 | 100.000 |

The preferred surfactant is alpha olefin sulfonate and the preferred sequestrate is tetrasodium ethylenediaminetetraacetate, found to be most compatible with the gum in solution. There are doubtless many surfactants which may be used since the role of the surfactant is that of a soap to aid removal of the solution (including an overspraying paint) when the job is finished, and also to allow a moist cloth to be used if necessary to remove any of the masking solution which may accidentally reach the area to be painted. The surfactant is also an aid to solutionizing the gum.

A sequestrate is preferably included as a safety measure, serving the role of a water softener (metal ion deactivator), preventing the formation of an insoluble soap or scale. Therefore, depending upon the nature of the local water, it may not be necessary.

The glycerol (water soluble) is an innocuous, inexpensive, non-toxic, odorless carrier or universal solvent assuring thorough coverage and penetration by the entire system over and through the dust film on the vehicle. It has a high boiling point (290° C.) and hence may also be taken as imparting non-drying or effective wetting properties to the masking solution, assuring the solution reaches all nooks and crannies, so to speak. (There may be other substitutes for glycerol: i.e. sorbitol).

The gum is a natural polysaccharide with a high molecular weight ($10^6$). Derived from *Xathomonas campestris,* it is a free-flowing, cream-colored, odorless, water-soluble powder. Even in the small amount used, it thickens the solution to a non-bleeding state and forms a strong but flexible film as the water evaporates, being spread by the glycerol. The gum is thus responsible for forming a thin, tacky film which will not run. The gum film also assures a sticky trap for any dust which may settle from the interior area where the vehicle is painted. Thus, a little of the gum goes a long way, so to speak. Hence, while I have described the attributes of the preferred active ingredients, it is to be understood these have been combined for superior performance.

The masking procedure is shown in the drawing where it is assumed, FIG. 1, there is a mere rectangular area 10 (panel) to be spray painted. The field 12 outside, all the remaining area of the vehicle, is the area not to be painted and hence the area to be solution-masked under the present invention. The area to be painted is edged, FIG. 2, with masking paper 14, peeled back along the sticky edges 14A adhered to the vehicle, and the outside field 16 is then spray coated (airless spray) with the masking solution of the present invention including those areas which will lie beneath the masking paper when it is folded over into the field. Following this final step of fold-over preparation, after allowing a minute or so for the water in the masking solution to evaporate, the panel 10 is painted.

As noted above, a pre-wash is not necessary; the use of masking paper (masking tape) is reduced to a minimum. If perchance some of the masking solution does get into the panel area 10 to be painted, it is easily wiped off with a clean, damp cloth. The solution is not expensive, since it is nearly 80 percent water, and the small amount of Xanthan gum has been found sufficient to prevent bleeding. The gum is insensitive to post-paint baking temperatures as high as 200° F. inside the paint booth, and can be removed afterwards with the normal finish-up wash. While I have specified the preferred proportions, these too are capable of variation.

I claim:

1. A masking solution to be applied to the area of a vehicle not to be painted, to settle dust that may be on that area of the vehicle and to trap fall-out dust and paint from an interior area where the vehicle is being painted, consisting essentially of about 76 weight percent water, about 22 weight percent glycerol, balance essentially equal parts by weight surfactant and Xanthan gum.

2. A masking solution according to claim 1 including, in the balance, a small amount of a sequestrant.

3. A method of masking the area of a vehicle not to be painted comprising the steps of edging the area to be painted with strips of peeled back masking paper, masking areas of the vehicle not to be painted with the solution of claim 1, including the area to be covered by the peeled back masking paper, folding over the peeled back masking paper into the field not to be painted, and then spray painting the unmasked area of the vehicle.

* * * * *